United States Patent [19]

Carter et al.

[11] Patent Number: 4,531,809
[45] Date of Patent: Jul. 30, 1985

[54] OPTICAL WAVEGUIDE COUPLING DEVICE

[75] Inventors: Gary M. Carter, Lexington; Yung-Jui Chen, Weston; Sukant K. Tripathy, Arlington, all of Mass.

[73] Assignee: GTE Laboratories Incorporated, Waltham, Mass.

[21] Appl. No.: 530,287

[22] Filed: Sep. 8, 1983

[51] Int. Cl.³ .............................................. G02B 5/18
[52] U.S. Cl. ............................. 350/96.19; 350/96.12; 350/162.23; 350/320; 430/321
[58] Field of Search ............. 350/96.11, 96.12, 96.13, 350/96.19, 96.34, 162.17, 162.20, 162.23, 320; 430/1, 313, 314, 321, 323

[56] References Cited

U.S. PATENT DOCUMENTS

| | | | |
|---|---|---|---|
| 3,898,585 | 8/1975 | Heidrich et al. | 350/96.19 X |
| 4,006,963 | 2/1977 | Baues et al. | 350/96.19 X |
| 4,227,769 | 10/1980 | Phillips et al. | 350/96.19 |
| 4,286,838 | 9/1981 | Huignard et al. | 350/96.11 |
| 4,431,263 | 2/1984 | Garito | 350/96.34 |
| 4,436,398 | 3/1984 | Endo et al. | 350/162.23 X |

Primary Examiner—John Lee
Attorney, Agent, or Firm—Fred Fisher; David M. Driscoll

[57] ABSTRACT

An optical waveguide coupling device which can perform switching functions by changing input light intensity, and associated method of construction thereof, in which the device comprises a base substrate etched to provide an optical grating having a predetermined grating period and amplitude. A thin metal film is deposited on the grating. Subsequently, a polymer film is deposited over the thin metal film, thus forming an optical waveguide. The field for the waveguide mode is nearly zero at the metal-polymer film interface, thus eliminating the loss of energy in the thin metal film. The metal film, in essence, reflects the input beam so that substantially no energy is lost via transmission through the thin metal film and thus all available energy is for coupling into the waveguide mode.

20 Claims, 12 Drawing Figures

R, R' ARE SIDE GROUPS
n AND m DICTATE THE SIZE OF THE MONOMER.

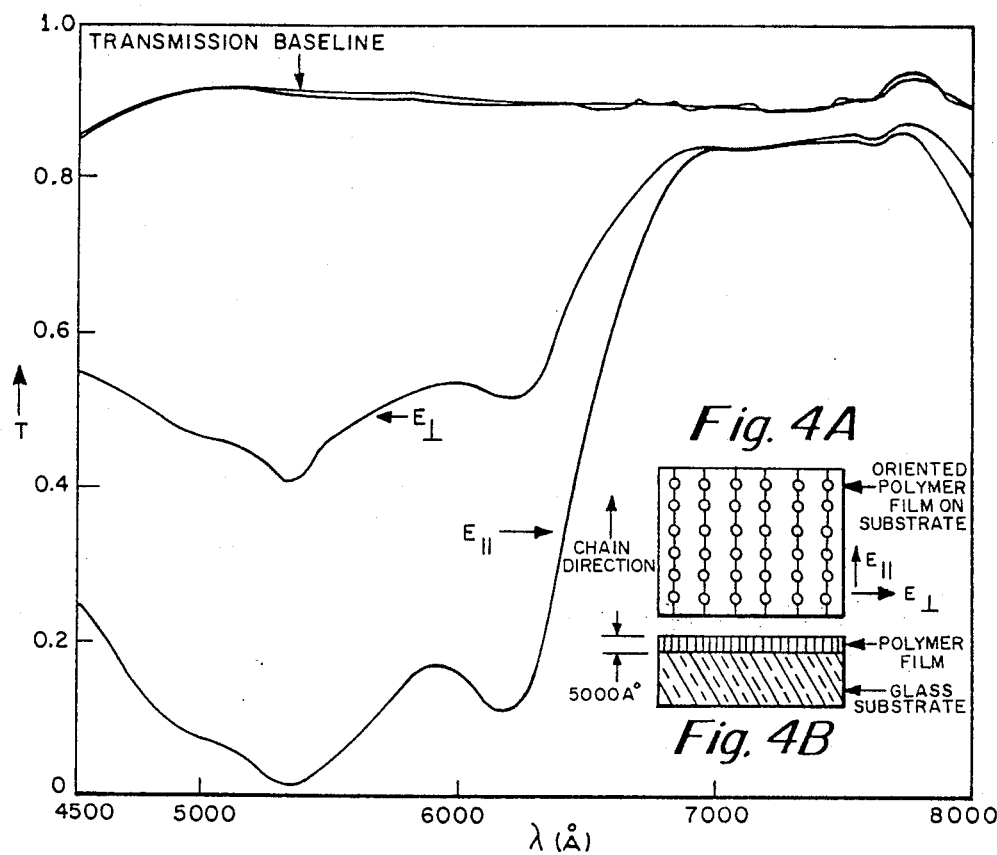
Fig. 4
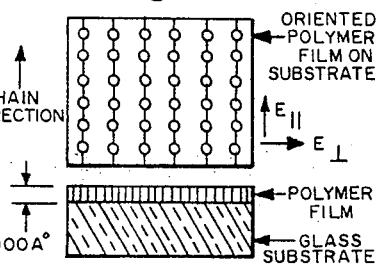
Fig. 4A
Fig. 4B
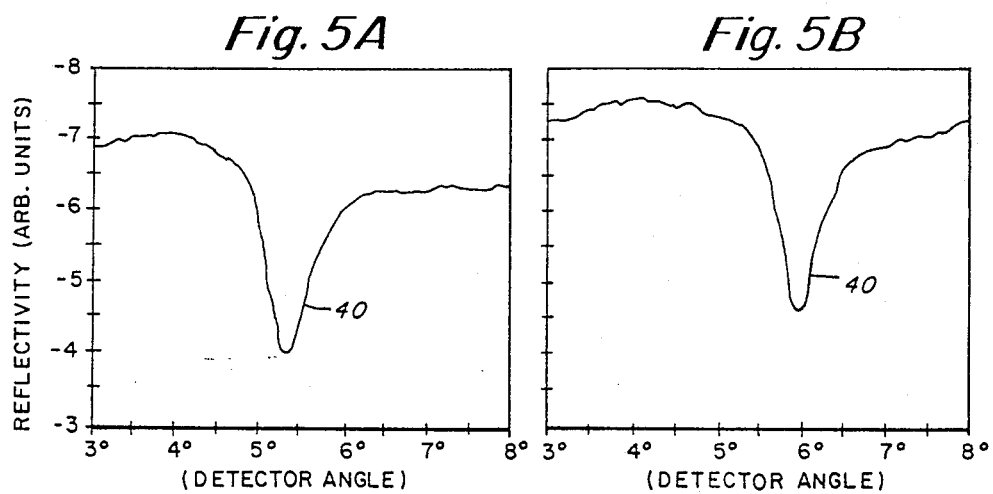
Fig. 5A
Fig. 5B
$\theta = 1/2$ DETECTOR ANGLE
$\lambda = 7300 \, \text{Å}$

OPTICAL WAVEGUIDE COUPLING DEVICE

BACKGROUND OF THE INVENTION

The present invention relates in general to an optical waveguide coupling device and pertains, more particularly, to an optical switch and an associated improved process of manufacturing the optical switch.

An optical switch is shown in copending application Ser. No. 521,512 filed Aug. 8, 1983. Such an optical switch causes light to switch into and out of a waveguide from an input laser beam by changing the intensity of the input laser beam or by changing the intensity of another (control) laser beam. In order to make an optical switch, the material forming the waveguide has to have a large non-linear index of refraction and there also has to be a way of controllably depositing the material to form the waveguide.

FIG. 1A schematically illustrates a traditional waveguide which is formed by three layers of material illustrated as layers 1, 2, and 3. The second layer has a larger index of refraction than either of the first or third layers. Reference is also made to FIG. 1B herein which shows an optical switch, such as in the aforementioned copending application Ser. No. 521,512, including a grating located and etched at the interface between layers 1 and 2. Layer 1 is often air. This grating allows light from an external beam to be coupled into the waveguide.

FIG. 1B shows the input beam 6 along with the transmitted beam 7 and the reflected beam 8. The grating is illustrated at 9. FIG. 1B also illustrates the waveguide intensity profile 10, which, it is noted, extends over all three layers and extends to a zero field only at the outer boundaries.

To form a non-linear optical coupling switch, the material of layer 2 has a large non-linear index of refraction. The index of refraction is given by the following equation:

$$n = n_0 + n_2 I.$$

where
 $n_0$ = linear index of refraction,
 $n_2$ = nonlinear index of refraction, and
 $I$ = laser intensity.

Also, in order that the optical switch be, say, faster than a counterpart electronic version, the non-linearity, preferably, has a relaxation time on the order of or less than 1 psec. One class of materials that satisfies these requirements is the polydiacetylenes, a family of organic polymers. However, the problem has been to deposit a smooth, optically flat, oriented film, such as a film having a thickness of approximately one wavelength, on a low index of refraction substrate. Moreover, with the system of FIG. 1B, idealized switching is not possible because part of the energy in the waveguide mode is in the material of layer 3, and some of the input beam is thus transmitted through the material of layer 3. Also, it is difficult to controllably etch gratings in the polymer.

OBJECTS OF THE INVENTION

Accordingly, it is an object of the present invention to provide an improved optical waveguide switch that is characterized by efficient switching, at least in reflection, permitting on the order of up to 100% of the energy from the input beam to be coupled into the waveguide.

Another object of the present invention is to provide an optical waveguide coupling device which is compatible with integrated optics.

A further object of the present invention is to provide an optical waveguide switch that has a sharp reflectivity dip and which, combined with the non-linear optical material characteristics, enhances the switching capabilities of the device.

Still another object of the present invention is to provide an optical waveguide coupling device that is capable of operation over a wide bandwidth.

A further object of the present invention is to provide an improved waveguide optical switch in the form of a planar waveguide and which is formed so as to alleviate the need for a low index substrate.

SUMMARY OF THE INVENTION

To accomplish the foregoing and other objects of this invention, there is provided an optical waveguide coupling device embodied herein as an optical switch and including a base substrate having formed therein, an optical grating. A thin metal film is deposited on the optical grating and thereafter a polymer film is deposited over the thin metal film. In a preferred embodiment of the invention, the substrate is a silicon substrate which is etched with the desired grating period and amplitude. The thin film may be of silver. The polymer film is a polydiacetylene which may be the diacetylene monomer $CH_3(CH_2)_{15}-C\equiv C-C\equiv C-(CH_2)_8-COOH$. The optical waveguide thus formed is characterized by the field for the waveguide mode being nearly zero at the metal interface, thus in effect eliminating the loss in energy in the substrate. Furthermore, the metal in essence reflects the input beam so no energy is lost by a transmission through the substrate, i.e. all energy is available for coupling into the waveguide mode. By the grating being etched on the silicon/metal substrate, the need for etching the grating in the polymer is thus eliminated.

BRIEF DESCRIPTION OF THE DRAWINGS

Numerous other objects, features and advantages of the invention should now become apparent upon a reading of the following detailed description, taken in conjunction with the accompanying drawing, in which:

FIG. 4 is a graph showing the difference in transmission for two polarizations of incident light for a 5000A thick film on a glass substrate;

FIGS. 4A and 4B are the top and side view, respectively, of the oriented polymer film;

FIGS. 5A and 5B show the reflection from the film grating system for a 5000A polydiacetylene film with a 500A deep grating and a 5000A period at both low (FIG. 5A) and high (FIG. 5B) input laser intensity in which it is noted that the coupling angle is shifted toward the larger angle as the input intensity is increased.

DETAILED DESCRIPTION

Figure 1A:
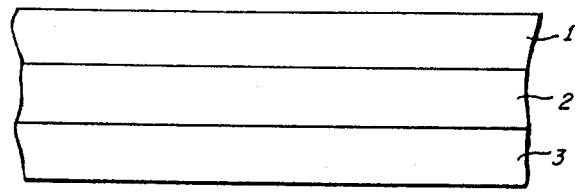
FIG. 1A shows a traditional optical waveguide comprised of three layers of material.
Figure 1B:
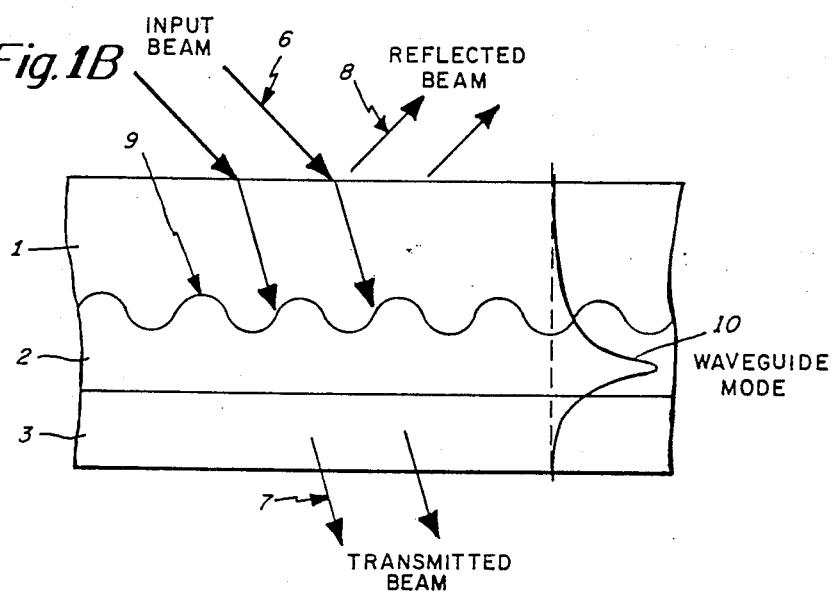
FIG. 1B illustrates the use of a grating which allows light from an external beam to be coupled into the waveguide.
Figure 2:
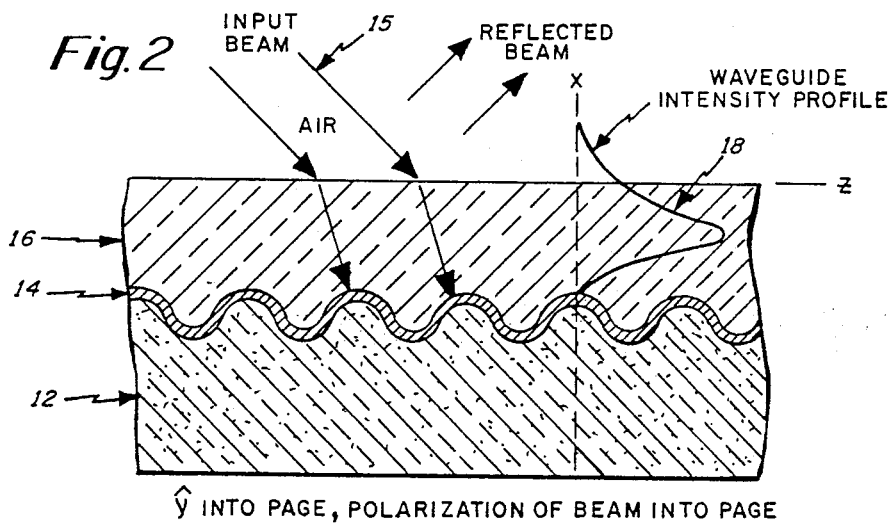
FIG. 2 illusrrates the optical waveguide constructed in accordance with the present invention employing a base substrate, a thin metal film thereover, and a final polymer film.

In accordance with the present invention, there is provided an optical waveguide which is operable as an optical coupling switch. Hereinbefore, in FIGS. 1A and 1B, there has been a description of a traditional optical waveguide comprised of three layers of material. As indicated previously, one of the problems that is to be overcome is the need for providing a non-linear optical coupling switch that can be deposited in a smooth, optically flat, oriented film that is of approximately one wavelength thickness and on a low index substrate. The solution, in accordance with the present invention, is to provide a semiconductor substrate, such as the silicon substrate 12 illustrated in FIG. 2. This silicon substrate may be first etched with the desired grating period and amplitude. A thin metal film 14 which is preferably silver, is then deposited on the grating. The thickness on this film may be on the order of approximately 1 $\mu$m. Next, the polymer film which is on the order of 0.5 $\mu$m thick is deposited over the silver film (for operating at wavelengths up to around 8000 A). An optical waveguide is thus formed. The drawings, possibly misleading, have been exaggerated. As indicated in FIG. 2, for TE polarized (the optical electric field polarized in the plane of the waveguide, ŷ direction) light, the field of the waveguide mode is nearly zero at the metal interface, thus in effect eliminating the loss of energy in the thin metal film 14. Furthermore, the metal in essence reflects the input beam 15 so that no energy is lost via transmission through the thin metal layer 14. In this way, substantially all input beam energy is available for coupling into the waveguide mode. In this regard, FIG. 2 shows the waveguide intensity profile at 18 illustrating the waveguide mode substantially at zero at the metal interface with the polymer film.

In fabricating the device of FIG. 2, there may be provided a silicon wafer as the substrate 12 which is coated with photoresist and then exposed to two interfering laser beams forming a holographic grating (=5000A period). The photoresist is then etched, leaving an approximate 500A deep grating in the silicon wafer. Silver is then evaporated to a thickness of approximately 1 $\mu$m over the silicon. This silver evaporation is in a vacuum chamber at $10^{-6}$ torr.

The next step in forming the device includes the growth of oriented, monomolecular layers of polydiacetylenes. A half micron thick layer of polydiacetylenes is thus, subsequently deposited on the grating substrate. The structural requirements placed on this polymeric layer is that the polymeric chains in the layer predominantly lie along the grating (FIG. 2, ŷ direction). This has been achieved in accordance with the present invention by a combination of film growth, polymerization, and deposition techniques.

One polydiacetylene that has been used is the diacetylene monomer $CH_3(CH_2)_{15}-C\equiv C-C\equiv C-(CH_2)_8-COOH$. The diacetylene monomer may be spread as a monomolecular layer deposited at the air-water interface of a commercial Langmuir Blodgett film balance (trough). Essentially, single crystalline 2-D crystals are obtained by first inducing the monomers to get into a single crystalline arrangement such that subsequent polymerization leads to the polymer chains being along the trough. The molecules are well oriented because of the preference of the hydrophilic head group of the monomer to be in coordination with the subphase. The hydrophillicity of the acid group (—COOH) tends to orient the molecules. The monomers may be spread using a solvent such as chloroform.

Figure 3:
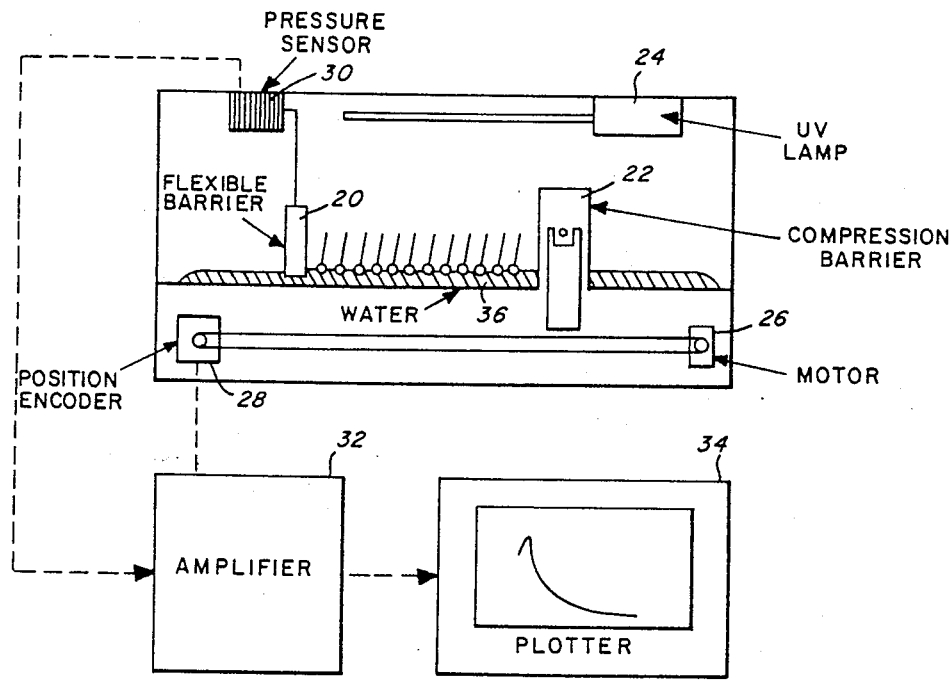
FIG. 3 illustrates a Langmuir Blodgett film apparatus employed in forming a polymer film.
Figure 3B:
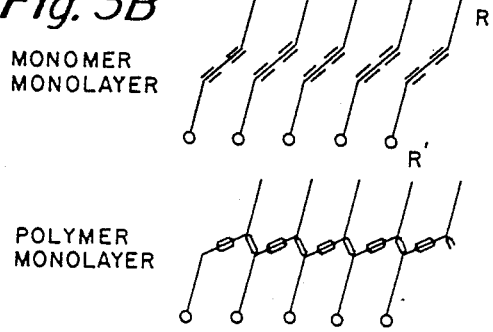
FIG. 3B shows schematically the chemical process of the polymerized monomer film.
Figure 3A:
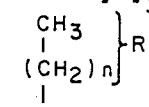
FIG. 3A shows one of the monomers which can be used by the Langmuir Blodgett deposition technique.
Figure 3A:
Figure 3A:
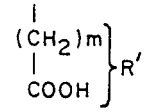

In connection with the Langmuir Blodgett apparatus, reference is now made to FIG. 3 which schematically illustrates the apparatus as including a flexible and fixed barrier 20, a movable (compression) barrier 22, an ultraviolet lamp 24, a motor 26, a position encoder 28, and a pressure sensor 30. Also depicted in FIG. 3 is an amplifier 32 and a conventional plotter 34. It is noted that the output of the sensor 30 couples to the amplifier 32 and the output of the amplifier couples both to the position encoder and to the plotter 34. FIG. 3 also illustrates the water bed 36 upon which is grown or deposited the monomer film.

The fixed barrier 20 has the pressure sensor or transducer 30 attached at one end and contains the monomer molecules within a surface region, also recording the surface pressure. The monomer solution is deposited close to the fixed barrier while moving the movable barrier away from the fixed barrier. The movable barrier may be moved through the length of the trough, and is used to reduce the surface area available per monomer, and thus get them into an organized continuous monolayer film. The rotational freedom of the monomer molecules is maintained until the monomers get into a tightly packed arrangement by saturating the region above the interface with the solvent vapor. The monomers are subsequently "squeezed" into a tightly packed arrangement. Polymerization is subsequently carried out in the solid state using a large area UV lamp 24 (254 nm). With the techniques of this invention, the resultant polymer assembly may be grown into a large area single crystalline sheet. The nature of the crystalline organization is established by electron diffraction techniques. By slowly and by repeatedly dipping the substrate edge into the polymer covered water surface, the polymer monolayer is transferred to the substrate. By using diffraction techniques, it has been verified that the polymer chains in the multilayer assembly lie in the plane.

Each formed monolayer of polydiacetylene is 30A–70A thick, depending upon the length of the side chains. Thus, approximately 100–150 of these polydiacetylene mono-molecular layers have to be transferred onto the grating, maintaining their registry and orientation. This is achieved by a multilayer dipping apparatus (not shown herein) that introduces the grating substrate with requisite speed through the interface. Because the film is maintained at a fixed surface pressure, it gets transferred onto the grating, layer by layer, at each passage of the grating through the interface. Again, relative arrangement of the grating assures the requisite orientation of the film on the grating substrate. As indicated previously, the films have been extensively characterized and their crystalline and orientation established through electron diffraction and the spectroscopic techniques. In this regard, reference is made to FIG. 4 which shows the difference in transmission for two polarizations of incident light for a 5000A thick film on a glass substrate. The large difference in transmission in the visible region is an indication of a high degree of orientation.

Figure 6:
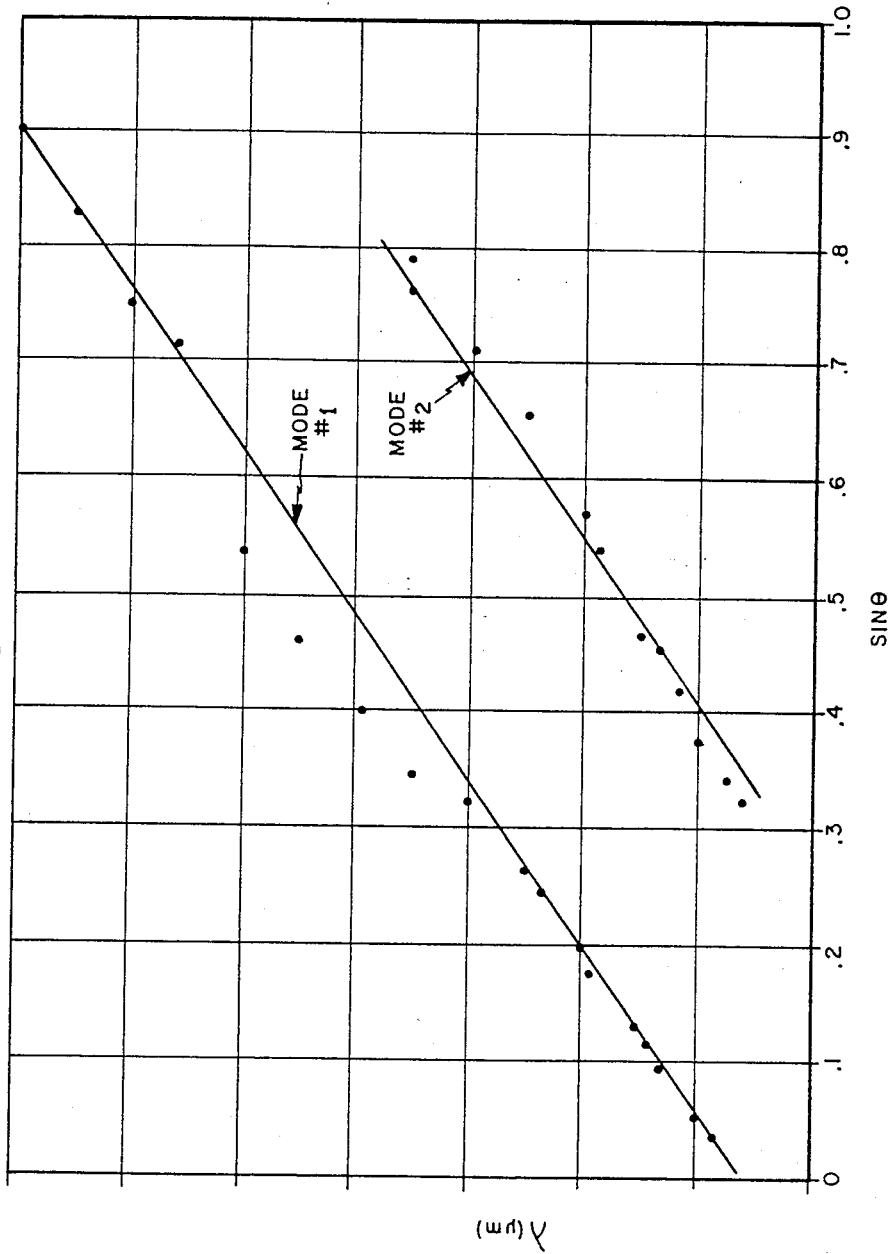
FIG. 6 is a plot of the wavelength of incident light versus the sine of the angle which is at the location of the reflectivity dip.

FIGS. 5A and 5B herein are two similar graphs illustrating the reflection from the film grating system hereinbefore described for a ~5000A polydiacetylene film, and a ~500A deep grating with a ~5000A period. The wavelength of the incident light is 7300A. The dip in reflectivity at 40 represents coupling of energy into the waveguide. Related to this is the plot shown in FIG. 6 which is a plot of the wavelength of incident light versus the sine of the angle which is at the location of the reflectivity dip 40. Ideally, if the effective mode index is $n_m$, then $n_m = \lambda/\Lambda\text{-sin }\theta$, where $\Lambda$ = wavelength of the incident light. Thus, the two straight parallel lines in FIG. 6 indicate the existence of two modes identified therein as modes No. 1 and No. 2. It is noted that the slope of each line is $(\Delta\lambda/\Delta \sin \theta) = \Lambda$. From FIG. 6 thus, the slope is approximately 5000A, the period of the grating. Finally, it is noted that the switching effect comes about by changing the intensity of the incident light and, thus, the index and the medium should change $(n = n_0 + n_2 I)$, thus changing the waveguide effective index $n_m$. Hence, by modulating the intensity of the light of the incident beam, one can then move the location of the reflection dip 40 and, hence, modulate the amount of power coupled into the waveguide, (or reflected therefrom). Therefore, in accordance with the present invention, there is provided a waveguide having a metal interface, which allows virtually 100% of the energy to be coupled into the waveguide, thus opening up the possibility of efficient switching (at least in reflection). The device of the present invention is also compatible with integrated optics. The sharp reflectivity dip, as illustrated in FIG. 5, combined with the nonlinear optical material characteristics, enhances switching capabilities greatly. Furthermore, the device is adapted for operation over a broad bandwidth.

Hereinbefore has been described one preferred diacetylene monomer. However, other such monomers may also be used. It is preferred, in accordance with the invention, that one side group of the monomer is to be hydrophilic (for example, COOH). The other side group is preferably hydrophobic (for example, $CH_3$).

Mention has heretofore also been made of preferred dimensional parameters associated with the monomer film and grating. The thickness of the polydiacetylene film, as well as the grating period and grating amplitude, are actually dependent upon the wavelength at which the device is operated. The grating period and the thickness of the film is on the order of $\lambda/1.5$ where 1.5 is the index of refraction of the polydiacetylene material at the transparent region (i.e. $\lambda > 7500A$). The grating amplitude is preferably on the order of $\lambda/10$. Using the above criteria one can also apply the technique to make waveguides at the 1.5 $\mu m$ region.

Having described one embodiment of the present invention, it should now be apparent to those skilled in the art that numerous other embodiments are contemplated as falling within the scope of this invention.

What is claimed is:

1. An optical waveguide coupling device comprising a base substrate having formed therein an optical grating, said base substrate comprising silicon, a thin metal film deposited on the optical grating, and a polymer film deposited over the thin metal film, whereby substantially all incident power may be coupled into the waveguide mode, and wherein said optical grating is formed by etching the silicon substrate with a predetermined grating period and amplitude.

2. An optical waveguide coupling device as set forth in claim 1 wherein said thin metal film comprises a noble metal.

3. An optical waveguide coupling device as set forth in claim 2 wherein said thin metal film comprises silver.

4. An optical waveguide coupling device as set forth in claim 1 wherein said thin metal film is deposited to a thickness on the order of 1 $\mu m$.

5. An optical waveguide coupling device as set forth in claim 1 wherein said optical grating has a period on the order of 5000A and an amplitude on the order of 500A.

6. An optical waveguide coupling device as set forth in claim 1 wherein the field for the waveguide mode is substantially zero at the metal/polymer film interface, thus substantially eliminating the loss of energy in the thin metal film.

7. An optical waveguide coupling device as set forth in claim 1 wherein said polymer film comprises a polydiacetylene.

8. An optical waveguide coupling device as set forth in claim 1 wherein said polymer film comprises an organic polymer.

9. An optical waveguide coupling device as set forth in claim 1 wherein said device is characterized by having a switching effect which is brought about by changing the intensity of the incident light.

10. An optical waveguide coupling device as set forth in claim 1 wherein said polymer film comprises the diacetylene monomer $CH_3(CH_2)_{15}-C\equiv C-C\equiv C-(CH_2)_8-COOH$.

11. An optical waveguide coupling device as set forth in claim 1 wherein said polymer film has a thickness on the order of 5000A deposited in multiple layers, each of 30A–70A.

12. An optical waveguide coupling device as set forth in claim 1 wherein the thickness of the polymer film as well as the grating period and amplitude are a function of the wavelength of device operation.

13. An optical waveguide coupling device as set forth in claim 1 wherein the grating period and thickness of the film is on the order of $\lambda/1.5$ where the factor 1.5 is the index of refraction of the polymer film at a transparent region thereof, and $\lambda$ is the wavelength of the light applied thereto.

14. An optical waveguide coupling device as set forth in claim 1 wherein the grating amplitude is on the order of $\lambda/10$, $\lambda$ being the wavelength of the light applied thereto.

15. A method of constructing an optical waveguide comprising the steps of
providing a base substrate,
forming, in the base substrate, an optical grating of predetermined period and amplitude, and
depositing a thin metal film, comprising silver deposited by evaporation, on the optical grating, and subsequently depositing a polymer film over the thin metal film,
whereby substantially all incident power may be coupled into the waveguide mode.

16. A method as set forth in claim 15 wherein said polymer film is deposited by separately growing a monomer film at an air/water interface of a Langmuir Blodgett film balance apparatus.

17. A method as set forth in claim 16 including dipping the metal deposited substrate so as to transfer said polymer layer to said substrate.

18. A method as set forth in claim 17 wherein said polymer layer transfer is repeated a number of times to form multiple layers as thick as 5000A.

19. A method as set forth in claim 18 wherein polymerization of said polymer layer is carried out using an ultraviolet source.

20. A method as set forth in claim 19 wherein the resultant polymer film is single crystalline and well oriented.

* * * * *